United States Patent
Kobayashi et al.

(10) Patent No.: US 7,307,465 B2
(45) Date of Patent: Dec. 11, 2007

(54) STEP-DOWN VOLTAGE OUTPUT CIRCUIT

(75) Inventors: Taku Kobayashi, Kyoto (JP); Keiichi Fujii, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 182 days.

(21) Appl. No.: 10/923,848

(22) Filed: Aug. 24, 2004

(65) Prior Publication Data
US 2005/0046464 A1    Mar. 3, 2005

(30) Foreign Application Priority Data
Aug. 29, 2003    (JP) .............................. 2003-306949

(51) Int. Cl.
*G05F 1/10* (2006.01)
(52) U.S. Cl. ..................... 327/535; 327/534; 327/536; 327/537; 327/538; 327/539; 323/313; 363/59
(58) Field of Classification Search ......... 327/534–539
See application file for complete search history.

(56) References Cited

U.S. PATENT DOCUMENTS

| | | | |
|---|---|---|---|
| 4,336,466 A * | 6/1982 | Sud et al. ..................... 327/537 |
| 5,483,205 A * | 1/1996 | Kawamura .................... 331/74 |
| 5,650,741 A * | 7/1997 | Nakamura et al. .......... 327/327 |
| 5,701,096 A * | 12/1997 | Higashiho ..................... 327/536 |
| 5,877,651 A * | 3/1999 | Furutani ...................... 327/538 |
| 5,920,226 A * | 7/1999 | Mimura ....................... 327/537 |
| 6,597,158 B2 * | 7/2003 | Umeda ......................... 323/268 |
| 6,700,434 B2 * | 3/2004 | Fujii et al. .................... 327/534 |
| 6,724,242 B2 * | 4/2004 | Kim et al. ................... 327/536 |
| 6,788,577 B2 * | 9/2004 | Mihara .................. 365/185.18 |
| 6,836,145 B2 * | 12/2004 | Mecier et al. ................. 326/38 |
| 2002/0130700 A1 * | 9/2002 | Walimbe et al. ............ 327/536 |
| 2004/0165407 A1 * | 8/2004 | Umeda et al. ................ 363/65 |
| 2006/0044031 A1 * | 3/2006 | Cheung et al. ............. 327/157 |

FOREIGN PATENT DOCUMENTS

| JP | 5-29360 | 2/1993 |
|---|---|---|
| JP | 7-78472 A | 3/1995 |

* cited by examiner

*Primary Examiner*—Tuan T. Lam
*Assistant Examiner*—Hiep Nguyen
(74) *Attorney, Agent, or Firm*—McDermott Will & Emery LLP

(57) ABSTRACT

To provide a step-down voltage output circuit which causes no latch-up phenomenon for the period between activation of a power supply and complete start of operation of a charge pump circuit. The step-down voltage output circuit of the present invention has the charge pump circuit with a first oscillator; a timer circuit in which a timer period is set according to an oscillating frequency of the above-mentioned first oscillator; and an N-channel MOS transistor in which one N-type diffusion layer is connected to an output terminal of the above-mentioned charge pump circuit, the other N-type diffusion layer is connected to ground potential, and a gate electrode is connected to an output terminal of the above-mentioned timer circuit to become conductive for the above-mentioned timer period.

12 Claims, 9 Drawing Sheets

STEP-DOWN VOLTAGE OUTPUT CIRCUIT

BACKGROUND OF THE INVENTION

The present invention relates to a step-down voltage output circuit used in a semiconductor integrated circuit.

Referring to FIG. 2 and FIG. 9, a step-down voltage output circuit using a charge pump circuit of a conventional example will be described. FIG. 9 is a block diagram of the step-down voltage output circuit using the charge pump circuit in the conventional example. FIG. 9 shows an oscillating circuit 1 which oscillates at a predetermined frequency and outputs a clock signal V1, a control logic 2 which receives the clock signal V1 as an input signal, a P-channel MOS transistor 3 (hereinafter referred to as "M1"), an N-channel MOS transistor 4 (hereinafter referred to as "M2"), an N-channel MOS transistor 5 (hereinafter referred to as "M3"), an N-channel MOS transistor 6 (hereinafter referred to as "M4"), a capacitor 7 having a capacity of C1, an inverter circuit 8 (hereinafter referred to as "INV1"), a power supply voltage applying terminal 9 (hereinafter referred to as "VCC terminal". The power supply voltage applied to the VCC terminal is defined as VCC) and a step-down voltage output terminal 10 (hereinafter referred to as VSUB terminal).

FIG. 2 is a view for showing the timing of operations of the step-down voltage output circuit using the charge pump circuit in the conventional example. To generate step-down voltage output voltage in the step-down voltage output circuit configured as shown in FIG. 9, the operation timings T3→T1→T3→T2→T3 forming one cycle need to be repeated. The operations in each timing T1, T2 and T3 will be described below.

Firstly, when the voltage VCC is applied from the VCC terminal 9, the oscillating circuit 1 starts self-oscillation and outputs the clock signal V1.

The clock signal V1 is an input signal of the control logic 2. The control logic 2 output signals V2 and V4 for controlling the ON/OFF operation of the M1, M2, M3 and M4. The signal V2 is an input signal of the INV1. The INV1 outputs the signal V3 of the inverted polarity to the signal V2.

During the operation timing T1, as the V2 is LOW, the V3 is HIGH and the V4 is LOW in polarity, the M1 is turned ON (operating state), the M2 is turned ON (operating state) and the M3 and M4 are turned OFF (non-operating state).

In this state, as one electrode of the capacitor 7 is connected to the VCC terminal and other electrode thereof is connected to the ground (hereinafter referred to as "GND"), the capacitor 7 is charged at a time constant determined by an ON resistance R1 of the M1 and capacity C1 of the capacitor 7 (hereinafter the voltage charged to the capacitor 7 is defined as "VC"). The voltage VC is substantially equal to the power supply voltage VCC.

During the operation timing T2, as the V2 is HIGH, the V3 is LOW and the V4 is HIGH in polarity, the M1 is turned OFF (non-operating state), the M2 is turned OFF (non-operating state) and the M3 and M4 are turned ON (operating state).

In this state, as one electrode of the capacitor 7 is connected to GND and other electrode thereof is connected to the VSUB terminal, the voltage charged during the operation timing T1 is discharged and step-down voltage −VC (=−VCC) is output to the VSUB terminal.

During the operation timing T3, as the V2 is HIGH, the V3 is LOW and the V4 is LOW in polarity, the M1, M2, M3 and M4 are turned OFF (non-operating state).

When the LOW period of the control signal V2 and the HIGH period of the control signal V4 are made to come close each other, the switching from LOW to HIGH in V2 and the switching from HIGH to LOW in V4 are delayed due to the effect of parasitic capacity consisted between gate electrodes of the M1 and M3 and substrate, and the M1 and M3 are turned ON (operating state) simultaneously, so that a pass-through current is passed between VCC and GND. For this reason, by putting the operation timing T3 for temporarily turning OFF all of the transistors at the shift from the operation timing T1 to the operation timing T2, the above-mentioned pass-through current is prevented from occurring.

By repeating the operation timings T3→T1→T3→T2→T3, the voltage charged to the capacitor 7 during the operation timing T1 eventually reaches VCC and the voltage of −VCC occurs in the VSUB terminal.

In the case where a semiconductor integrated circuit has such step-down voltage output circuit therein and feeds the substrate potential from the VSUB terminal, the circuit which is connected to the VSUB terminal and serves as a load of the step-down voltage output circuit can receive the power supply voltage −VC as well as the power supply voltage VC. For example, when an audio circuit is the load circuit, the output dynamic range of the audio circuit which receives the power supply voltage VC and −VC becomes larger twice as much as the circuit which receives only the power supply voltage VC.

However, in the conventional step-down voltage output circuit configured as mentioned above, when the VSUB terminal 10 is connected to the substrate potential, there causes a delay between activation of the power supply VCC and output of the clock signal V1 at a predetermined amplitude from the oscillating circuit 1. During the period between the time when the power supply VCC is activated and the time when the oscillating circuit 1 outputs the clock signal V1 at the predetermined amplitude and the charge pump circuit is operated fully according to the clock signal V1, the step-down voltage which is generated at the VSUB terminal 10 is a low voltage close to the GND potential. In addition, during the period, as the VSUB terminal 10 is connected to a drain terminal of the N-channel MOS transistor M4, the output impedance of the VSUB terminal 10 becomes high impedance and the substrate potential connected to the VSUB terminal 10 becomes unstable. As a result, the conventional step-down voltage output circuit has the disadvantage that a thyristor formed of parasitic elements on the load circuit of the substrate potential is triggered at activation, which tends to cause the damage of the circuit, that is, so-called latch-up phenomenon.

BRIEF SUMMARY OF THE INVENTION

The present invention is made to solve the above-mentioned conventional disadvantage, and intends to provide a step-down voltage output circuit which prevents latch-up phenomenon in a load circuit for the period between activation of a power supply and complete start of operation of a charge pump circuit.

To solve the above-mentioned disadvantage, the step-down voltage output circuit of the present invention has the following configuration. According to an aspect of the present invention, a step-down voltage output circuit has a charge pump circuit with a first oscillator; a timer circuit in which a timer period is set according to an oscillating frequency of the above-mentioned first oscillator; and an N-channel MOS transistor in which one N-type diffusion layer is connected to an output terminal of the above-mentioned charge pump circuit, the other N-type diffusion layer is connected to ground potential, and a gate electrode is connected to an output terminal of the above-mentioned timer circuit to become conductive for the above-mentioned timer period.

According to another aspect of the present invention, a step-down voltage output circuit has an output terminal; a charge pump circuit having a first oscillator, a control logic part which receives an output signal of the above-mentioned first oscillator as a clock and generates a first conduction instruction and a second conduction instruction, a first switching element which connects power supply potential to one end of a capacitor and becomes conductive according to the above-mentioned first conduction instruction, a second switching element which connects the other end of the above-mentioned capacitor to ground potential and becomes conductive according to the above-mentioned first conduction instruction, a third switching element which connects ground potential to one end of the above-mentioned capacitor and becomes conductive according to the above-mentioned second conduction instruction, and a fourth switching element which connects the other end of the above-mentioned capacitor to the above-mentioned output terminal and becomes conductive according to the above-mentioned second conduction instruction; a timer circuit that receives an output signal of the above-mentioned first oscillator and generates a third conduction instruction to become HIGH level for a predetermined period after the above-mentioned power supply potential is activated; and an N-channel MOS transistor or an NPN-type bipolar transistor in which one N-type diffusion layer is connected to the above-mentioned output terminal, the other N-type diffusion layer is connected to the above-mentioned ground potential, and a gate electrode or a base electrode receives the above-mentioned third conduction instruction to become conductive for a predetermined period after the above-mentioned power supply potential is activated.

The present invention has the effect of realizing the step-down voltage output circuit which prevents latch-up phenomenon for the period between activation of the power supply and complete start of operation of the charge pump circuit.

According to another aspect of the present invention, a step-down voltage output circuit has a charge pump circuit; an N-channel MOS transistor in which one N-type diffusion layer is connected to an output terminal of the above-mentioned charge pump circuit and the other N-type diffusion layer is connected to ground potential; and a control terminal which applies a control signal for controlling the operation of the above-mentioned N-channel MOS transistor to a gate electrode.

According to another aspect of the present invention, a step-down voltage output circuit has an output terminal; a charge pump circuit having a first oscillator, a control logic part which receives an output signal of the above-mentioned first oscillator as a clock and generates a first conduction instruction and a second conduction instruction, a first switching element which connects power supply potential to one end of a capacitor and becomes conductive according to the above-mentioned first conduction instruction, a second switching element which connects the other end of the above-mentioned capacitor to ground potential and becomes conductive according to the above-mentioned first conduction instruction, a third switching element which connects ground potential to one end of the above-mentioned capacitor and becomes conductive according to the above-mentioned second conduction instruction, and a fourth switching element which connects the other end of the above-mentioned capacitor to the above-mentioned output terminal and becomes conductive according to the above-mentioned second conduction instruction; a control terminal which receives a third conduction instruction; and an N-channel MOS transistor or an NPN-type bipolar transistor in which one N-type diffusion layer is connected to the above-mentioned output terminal and the other N-type diffusion layer is connected to the above-mentioned ground potential to become conductive according to the above-mentioned third conduction instruction input to a gate electrode or a base electrode from the above-mentioned control terminal.

The present invention has the effect of realizing the step-down voltage output circuit which prevents latch-up phenomenon in the load circuit for the period between activation of the power supply and complete start of operation of the charge pump circuit by controlling and turning ON the N-channel MOS transistor (or the NPN-type bipolar transistor) from outside.

For example, an external microcomputer that control the output circuit of the power supply voltage VCC fed to the step-down voltage output circuit of the prevent invention supplies the above-mentioned control signal, thereby to control the power supply voltage VCC and step-down voltage (−VC) with being correlated with each other. For example, in set apparatuses with various central units, the present invention has the effect of realizing the step-down output circuit that prevents latch-up in the load circuit by being used in the system that performs initial control at activation of the power supply according to the way the power supply is activated, which is suited for the set apparatus.

According to another aspect of the present invention, the above-mentioned step-down voltage output circuit further has a second oscillator which is different from the above-mentioned first oscillator and in the above-mentioned timer circuit, a timer period is set according to the oscillating frequency of the above-mentioned second oscillator in place of the above-mentioned first oscillator.

According to another aspect of the present invention, the above-mentioned step-down voltage output circuit further has a second oscillator which is different from the above-mentioned first oscillator and the above-mentioned timer circuit receives an output signal of the above-mentioned second oscillator in place of the above-mentioned first oscillator as a clock and generates the above-mentioned third conduction instruction.

By providing the second oscillating circuit which is different from the first oscillating circuit for controlling the operation of the charge pump circuit, the present invention controls the N-channel MOS transistor (or the NPN-type bipolar transistor) so as to be turned ON for any period that is equal to or more than the period between activation of the power supply and complete start of the charge pump circuit, completely independent of the operation of the charge pump circuit. The present invention has the effect of realizing the step-down output circuit that prevents latch-up in the load circuit.

According to another aspect of the present invention, the above-mentioned step-down voltage output circuit further has a control terminal which receives a control signal from outside and the oscillating frequency of the above-mentioned first oscillator is changed according to the above-mentioned control signal.

By inputting the oscillating frequency control voltage to the oscillating frequency control voltage input terminal (control terminal), the present invention controls the oscillating frequency of the first oscillating circuit for controlling the operation of the charge pump circuit. The present invention has the effect of realizing the step-down output circuit that prevents latch-up in the load circuit by controlling the N-channel MOS transistor (or the NPN-type bipolar transistor) so as to be turned ON for any period that is equal to or more than the period between activation of the power supply and complete start of the charge pump circuit.

According to another aspect of the present invention, the above-mentioned step-down voltage output circuit further has a control terminal which receives a control signal from outside and the oscillating frequencies of the above-mentioned first oscillator and the above-mentioned second oscillator are changed according to the above-mentioned control signal.

By inputting the oscillating frequency control voltage to the oscillating frequency control voltage input terminal (control terminal), the present invention controls the oscillating frequencies of the first oscillating circuit and the second oscillating circuit. The present invention has the effect of realizing the step-down output circuit that prevents latch-up in the load circuit by controlling the N-channel MOS transistor (or the NPN-type bipolar transistor) so as to be turned ON for any period that is equal to or more than the period between activation of the power supply and complete start of the charge pump circuit.

For example, by inputting the oscillating frequency control voltage from the external microcomputer to the oscillating frequency control voltage input terminal, the oscillating frequency of the first oscillating circuit can be controlled and the period during which the N-channel MOS transistor (or the NPN-type bipolar transistor) is turned ON can be extended or shortened according to the oscillating frequency of the first oscillating circuit.

According to another aspect of the present invention, the above-mentioned step-down voltage output circuit has a control terminal which receives a control signal from outside and the oscillating frequency of the above-mentioned second oscillator is changed according to the above-mentioned control signal.

By inputting the oscillating frequency control voltage to the oscillating frequency control voltage input terminal (control terminal), the present invention controls the oscillating frequency of the second oscillating circuit. The present invention has the effect of realizing the step-down output circuit that prevents latch-up in the load circuit by controlling the N-channel MOS transistor (or the NPN-type bipolar transistor) so as to be turned ON for any period that is equal to or more than the period between activation of the power supply and complete start of the charge pump circuit.

For example, by inputting the oscillating frequency control voltage from the external microcomputer to the oscillating frequency control voltage input terminal, the period during which the N-channel MOS transistor (or the NPN-type bipolar transistor) is turned ON can be extended or shortened according to the case.

According to another aspect of the present invention, in the above-mentioned step-down voltage output circuit, while the above-mentioned third conduction instruction is output, the above-mentioned third switching element and the above-mentioned fourth switching element are put into a blocking state. The present invention prevents the N-channel MOS transistor (or the NPN-type bipolar transistor) and the like from being damaged due to the short circuit discharge current of the capacitor in the case where the capacity of the capacitor of the charge pump is large.

According to another aspect of the present invention, in the above-mentioned step-down voltage output circuit, while the above-mentioned third conduction instruction is output, the above-mentioned first switching element and the above-mentioned second switching element are put into a conductive state. According to the present invention, as the capacitor of the charge pump is kept to be in a charged state while the N-channel MOS transistor (or the NPN-type bipolar transistor) is turned ON, the time elapsed before the voltage at both ends of the capacitor reaches a predetermined voltage (approximate to the power supply voltage) can be reduced.

The present invention has an advantageous effect of realizing the step-down voltage output circuit which prevents latch-up phenomenon for the period between activation of the power supply and complete start of operation of the charge pump circuit.

The present invention has an advantageous effect of realizing the step-down voltage output circuit which performs initial control at activation of the power supply according to the way of the activation of the power supply in various set apparatuses.

The novel features of the invention are set forth with particularity in the appended claims. The invention as to both structure and content, and other objects and features thereof will best be understood from the detailed description when considered in connection with the accompanying drawings.

Part or All of the drawings are drawn schematically for diagrammatic representation and it should be considered that they do not necessarily reflect relative size and position of components shown therein.

DETAILED DESCRIPTION OF THE INVENTION

Embodiments that specifically describe best modes for conducting the present invention will be described referring to figures below.

Embodiment 1

Figure 1:
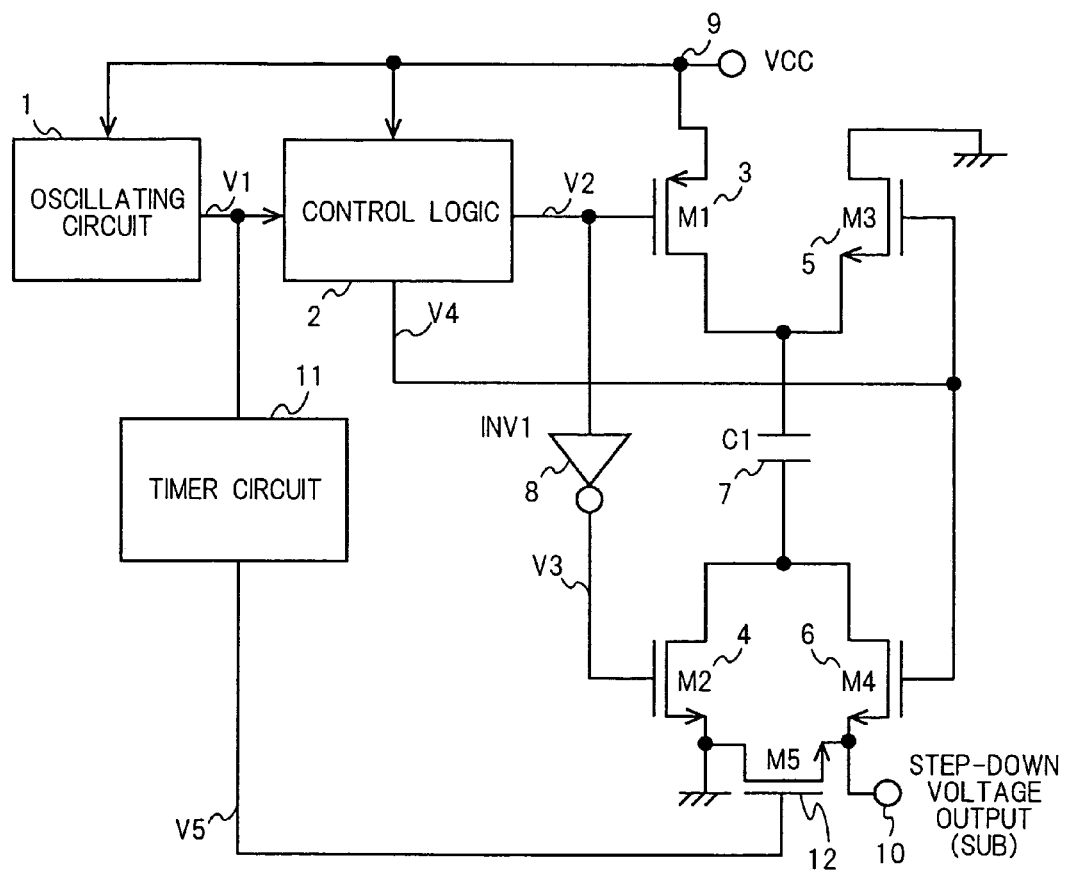
FIG. 1 is a block diagram of a step-down voltage output circuit using a charge pump circuit in accordance with a first embodiment of the present invention.
Figure 2:
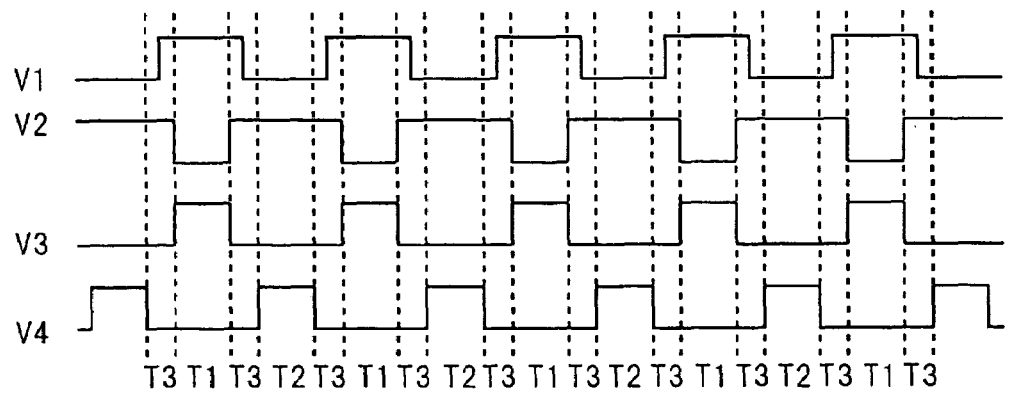
FIG. 2 is a view for showing of the timing of operations of step-down voltage output circuits using a charge pump circuit in accordance with a conventional example and first to sixth embodiments of the present invention.
Figure 3:
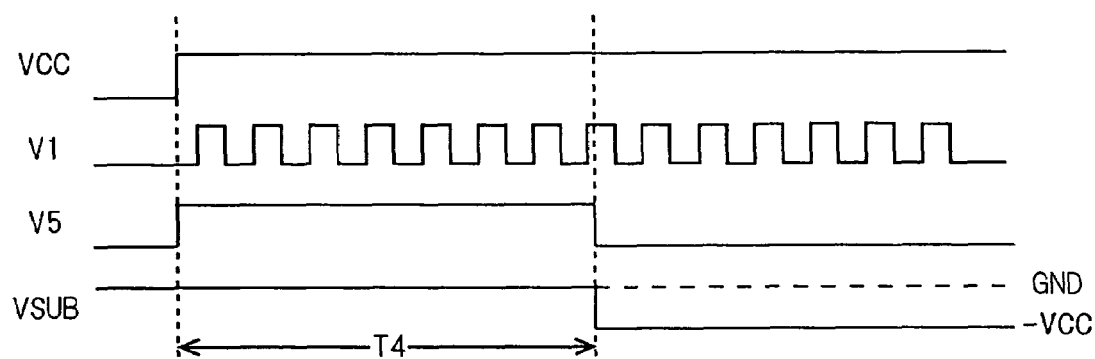
FIG. 3 is a view for showing of the timing of operations at power-on of the step-down voltage output circuits using the charge pump circuit in accordance with the first to sixth embodiments of the present invention.

Referring to FIG. 1 to FIG. 3, a step-down voltage output circuit using a charge pump circuit in accordance with a first embodiment of the present invention will be described. FIG. 1 is a block diagram of the step-down voltage output circuit using the charge pump circuit in accordance with the first embodiment of the present invention. FIG. 1 shows an oscillating circuit 1 which oscillates at a predetermined frequency and outputs a clock signal V1, a control logic 2 which receives the clock signal V1 as an input signal, a P-channel MOS transistor 3 (hereinafter referred to as "M1"), an N-channel MOS transistor 4 (hereinafter referred to as "M2"), an N-channel MOS transistor 5 (hereinafter referred to as "M3"), an N-channel MOS transistor 6 (hereinafter referred to as "M4"), a capacitor 7 having a capacity of C1, an inverter circuit 8 (hereinafter referred to as "INV1"), a power supply voltage application terminal 9 (hereinafter referred to as "VCC terminal"). The power supply voltage applied to the VCC terminal is defined as "VCC", a step-down voltage output terminal 10 (hereinafter referred to as "VSUB terminal"), a timer circuit 11 and an N-channel MOS transistor 12 (hereinafter referred to as "M5"). The step-down voltage output circuit in accordance with the first embodiment is formed on a semiconductor device.

FIG. 2 is a view for showing the timing of operations of the step-down voltage output circuit using the charge pump circuit in accordance with the first embodiment of the present invention. To generate step-down voltage output voltage in the step-down voltage output circuit configured as shown in FIG. 1, the operation timings T3→T1→T3→T2→T3 forming one cycle need to be repeated. The operations in each timing T1, T2 and T3 are similar to those in the conventional example.

FIG. 3 is a view for showing of the timing of operations at power-on of the step-down voltage output circuit using the charge pump circuit in accordance with the first embodiment of the present invention. The timer circuit 11 receives the clock signal V1 output from the oscillating circuit 1 and outputs a timer circuit output signal V5 for controlling the ON/OFF operation of the M5. The timer circuit output signal V5 is a signal that follows activation of VCC to become HIGH, remains HIGH for any period which is equal to or more than the period between activation of the power supply and complete start of the operation of the charge pump circuit (hereinafter referred to as "T4"), and outputs LOW at all times after the period T4.

Accordingly, during the period T4, the M5, the gate electrode of which is connected to the V5, is turned ON, the VSUB terminal is short-circuited to the GND and the output impedance becomes low impedance. After the period T4, the M5 is turned OFF and the voltage −VCC is generated at the VSUB terminal. After activation of the power supply, the output impedance of the VSUB terminal is kept to be low impedance. This prevents latch-up from occurring in the load circuit connected to the VSUB terminal at activation of the power supply.

Embodiment 2

Figure 4:
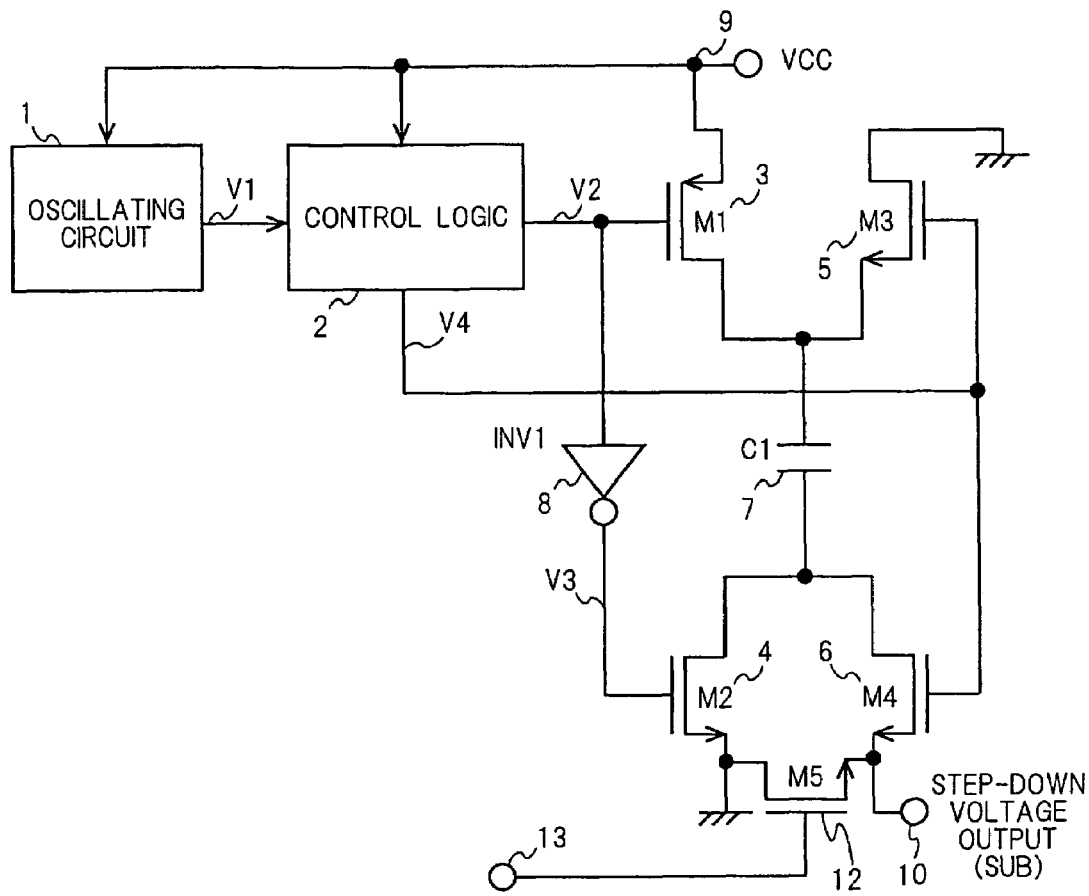
FIG. 4 is a block diagram of the step-down voltage output circuit using the charge pump circuit in accordance with the second embodiment of the present invention.

Referring to FIG. 2 to FIG. 4, a step-down voltage output circuit using a charge pump circuit in accordance with a second embodiment of the present invention will be described. FIG. 4 is a block diagram of the step-down voltage output circuit using the charge pump circuit in accordance with the second embodiment of the present invention. The second embodiment (FIG. 4) is different from the first embodiment (FIG. 1) in that a control signal input terminal 13 for controlling the operation of the N channel MOS transistor M5 is replaced with the timer circuit 11. In FIG. 4, the same reference numerals are assigned to the same components in FIG. 1 (first embodiment) and description thereof is omitted.

FIG. 4 shows an oscillating circuit 1 which oscillates at a predetermined frequency and outputs a clock signal V1, a control logic 2 which receives the clock signal V1 as an input signal, an M1 3, an M2 4, an M3 5, an M4 6, a capacitor 7, an INV1 8, a VCC terminal 9, a VSUB terminal 10, an N-channel MOS transistor M5 12 and a control signal input terminal 13 for controlling the operation of the N channel MOS transistor M5.

FIG. 2 is a view for showing of the timing of operation of the step-down voltage output circuit using the charge pump circuit in accordance with the second embodiment of the present invention. As FIG. 2 is common to the first embodiment, description thereof is omitted.

FIG. 3 is a view for showing of the timing of the operation at power-on of the step-down voltage output circuit using the charge pump circuit in accordance with the second embodiment of the present invention. The control signal input terminal 13 follows activation of VCC to become HIGH, remains HIGH for any period (T4) which is equal to or more than the period between activation of the power supply and complete start of operation of the charge pump circuit, and outputs LOW at all times after the period T4.

Accordingly, during the period T4 which is equal to or more than the period between activation of the power supply and complete start of operation of the charge pump circuit, the M5 is turned ON, the VSUB terminal is short-circuited to the GND and the output impedance becomes low impedance. After the period T4, the M5 is turned OFF and the voltage −VCC is generated at the VSUB terminal. After activation of the power supply, the output impedance of the VSUB terminal is kept to be low impedance. This prevents latch-up from occurring in the load circuit connected to the VSUB terminal at activation of the power supply.

For example, an external microcomputer can control the power supply voltage VCC and the step-down voltage −VC with being correlated with each other by supplying a control signal from the external terminal 13. The external microcomputer turns on the M5, for example, for a predetermined period (such as the same period as the period T4 in the first embodiment) after activation of the power supply VCC. This can achieve the same effect as in the first embodiment.

Embodiment 3

Figure 5:
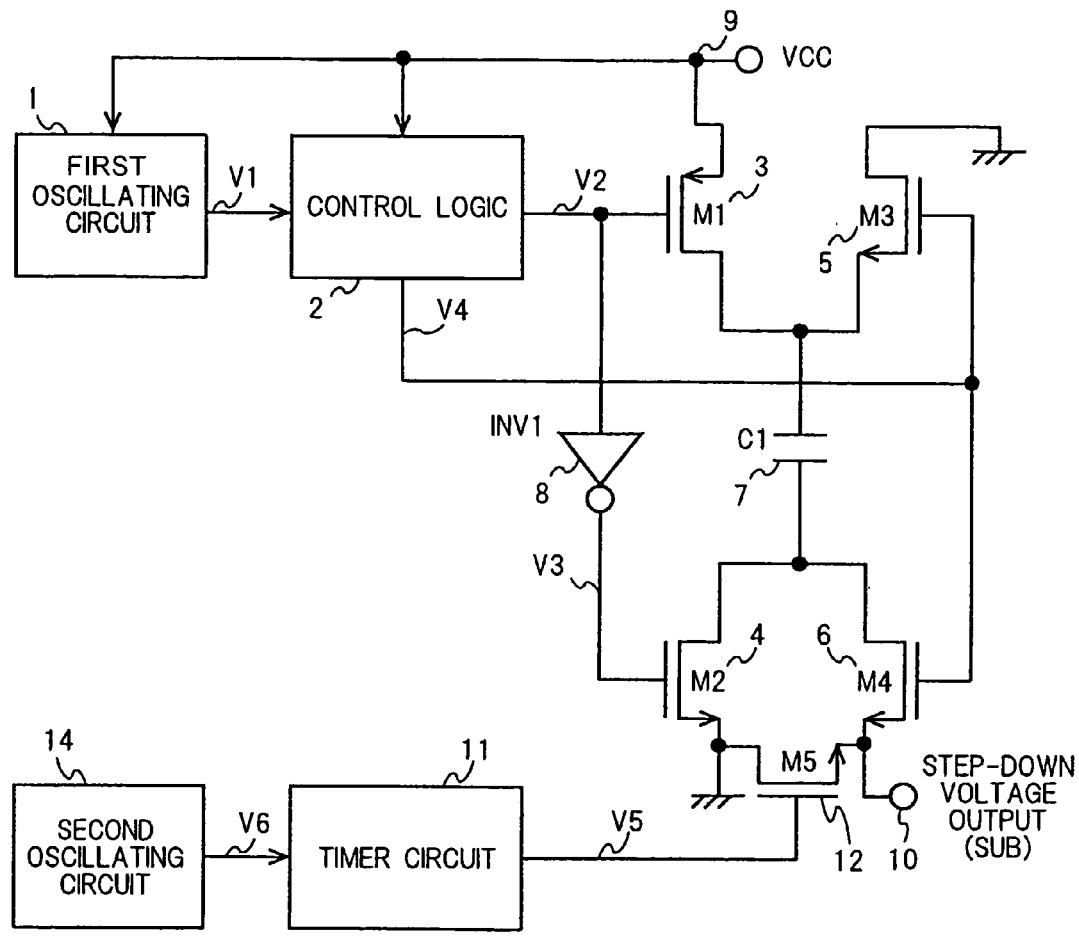
FIG. 5 is a block diagram of the step-down voltage output circuit using the charge pump circuit in accordance with the third embodiment of the present invention.

Referring to FIG. 2, FIG. 3 and FIG. 5, a step-down voltage output circuit using a charge pump circuit in accordance with a third embodiment of the present invention will be described. FIG. 5 is a block diagram of the step-down voltage output circuit using the charge pump circuit in accordance with the third embodiment of the present invention. The third embodiment (FIG. 5) is different from the first embodiment (FIG. 1) in that a second oscillating circuit 14 which is different from a first oscillating circuit 1 is added. In FIG. 5, the same reference numerals are assigned to the same components in FIG. 1 (first embodiment) and description thereof is omitted.

FIG. 5 shows the oscillating circuit 1 which oscillates at a predetermined frequency and outputs a clock signal V1, a control logic 2 which receives the clock signal V1 as an input signal, an M1 3, an M2 4, an M3 5, an M4 6, a capacitor 7, an INV1 8, a VCC terminal 9, a VSUB terminal 10, a timer circuit 11, an N-channel MOS transistor M5 12 and a second oscillating circuit 14 which is different from the oscillating circuit 1.

FIG. 2 is a view for showing of the timing of operation of the step-down voltage output circuit using the charge pump circuit in accordance with the third embodiment of the present invention. As FIG. 2 is common to the first embodiment, description thereof is omitted.

FIG. 3 is a view for showing of the timing of operation at power-on of the step-down voltage output circuit using the charge pump circuit in accordance with the third embodiment of the present invention. When VCC is applied, the second oscillating circuit 14 starts self-oscillation and outputs a clock signal V6. The timer circuit 11 receives the clock signal V6 output from the second oscillating circuit 14 and outputs a timer circuit output signal V5 for controlling the ON/OFF operation of the M5. The timer circuit output signal V5 is a signal that follows activation of VCC to become HIGH, remains HIGH for any period (T4) which is equal to or more than the period between activation of the power supply and complete start of operation of the charge pump circuit, and outputs a LOW at all times after the period T4.

Accordingly, during the period T4, the M5, the gate electrode of which is connected to the V5, is turned ON, the VSUB terminal is short-circuited to the GND and the output impedance becomes low impedance. After the period T4, the M5 turns OFF and the voltage –VCC is generated at the VSUB terminal. After activation of the power supply, the output impedance of the VSUB terminal is kept to be low impedance. This prevents latch-up from occurring in the load circuit connected to the VSUB terminal at activation of the power supply.

Embodiment 4

Figure 6:
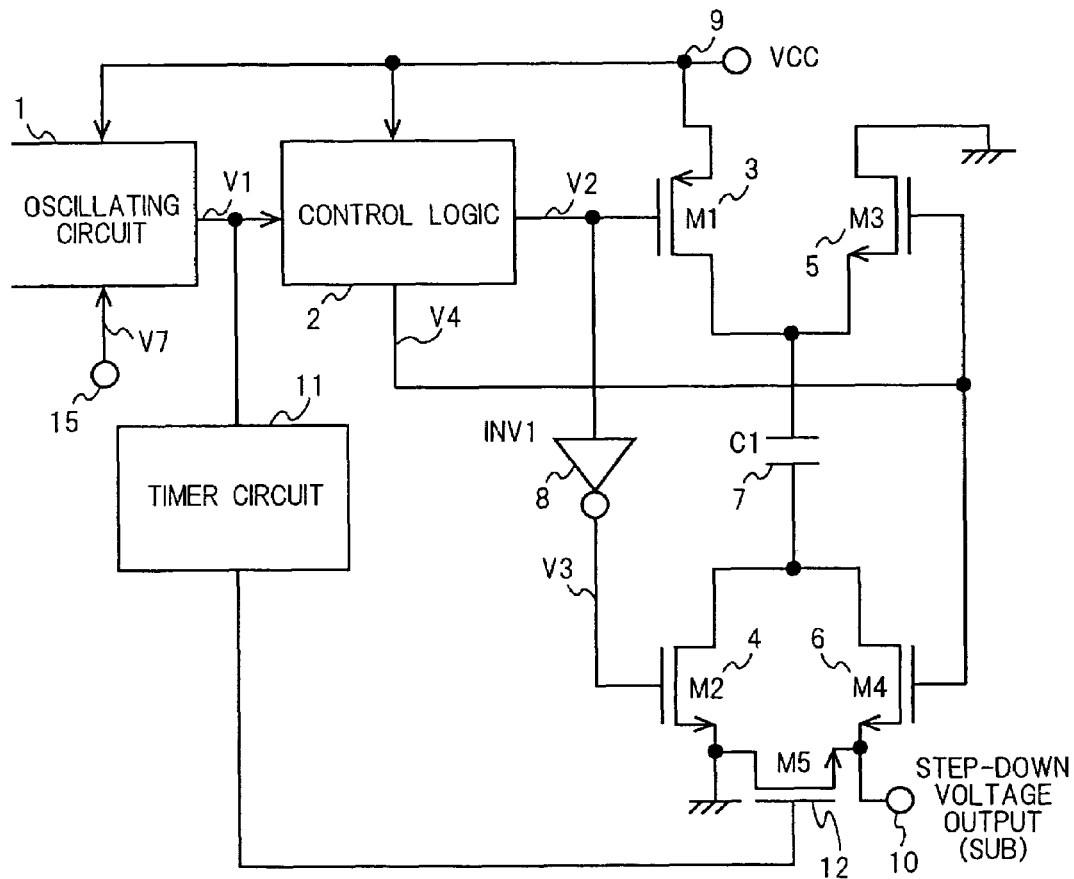
FIG. 6 is a block diagram of the step-down voltage output circuit using the charge pump circuit in accordance with the fourth embodiment of the present invention.

Referring to FIG. 2, FIG. 3 and FIG. 6, a step-down voltage output circuit using a charge pump circuit in accordance with a fourth embodiment of the present invention will be described. FIG. 6 is a block diagram of the step-down voltage output circuit using the charge pump circuit in accordance with the fourth embodiment of the present invention. The fourth embodiment (FIG. 6) is different from the first embodiment (FIG. 1) in that an oscillating frequency control voltage input terminal 15 of an oscillating circuit 1 is added. In FIG. 6, the same reference numerals are assigned to the same components in FIG. 1 (first embodiment) and description thereof is omitted.

FIG. 6 shows the oscillating circuit 1 which oscillates at a predetermined frequency and outputs a clock signal V1, a control logic 2 which receives the clock signal V1 as an input signal, an M1 3, an M2 4, an M3 5, an M4 6, a capacitor 7, an INV1 8, a VCC terminal 9, a VSUB terminal 10, a timer circuit 11, an N-channel MOS transistor M5 12 and an oscillating frequency control voltage input terminal 15 for the oscillating circuit 1.

FIG. 2 is a view for showing of the timing of operation of the step-down voltage output circuit using the charge pump circuit in accordance with the fourth embodiment of the present invention. As FIG. 2 is common to the first embodiment, description thereof is omitted.

FIG. 3 is a view for showing of the timing of operation at power-on of the step-down voltage output circuit using the charge pump circuit in accordance with the fourth embodiment of the present invention. When VCC is applied, the oscillating circuit 1 starts self-oscillation and outputs a clock signal V1 the oscillating frequency of which is controlled, based on a voltage V7 input from the oscillating frequency control voltage input terminal 15. As other operations in this embodiment are the same as those in the first embodiment, description thereof is omitted. In this embodiment, the oscillating frequency of the oscillating circuit 1 can be controlled from outside.

Embodiment 5

Figure 7:
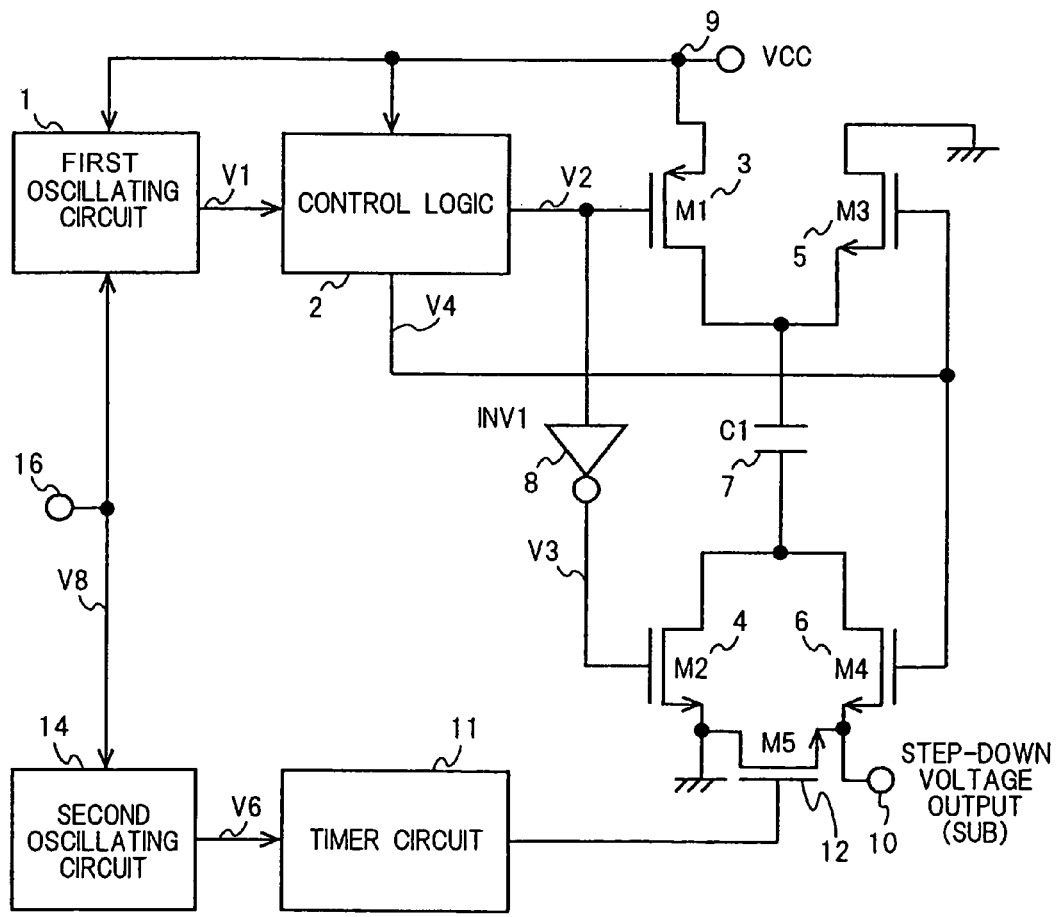
FIG. 7 is a block diagram of the step-down voltage output circuit using the charge pump circuit in accordance with the fifth embodiment of the present invention.

Referring to FIG. 2, FIG. 3 and FIG. 7, a step-down voltage output circuit using a charge pump circuit in accordance with a fifth embodiment of the present invention will be described. FIG. 7 is a block diagram of the step-down voltage output circuit using the charge pump circuit in accordance with the fifth embodiment of the present invention. The fifth embodiment (FIG. 7) is different from the third embodiment (FIG. 5) in that an oscillating frequency control voltage input terminal 16 for an oscillating circuit 1 and a second oscillating circuit 14 which is different from the oscillating circuit 1 is added. In FIG. 7, the same reference numerals are assigned to the same components in FIG. 5 (third embodiment) and description thereof is omitted.

FIG. 7 shows the oscillating circuit 1 which oscillates at a predetermined frequency and outputs a clock signal V1, a control logic 2 which receives the clock signal V1 as an input signal, an M1 3, an M2 4, an M3 5, an M4 6, a capacitor 7, an INV1 8, a VCC terminal 9, a VSUB terminal 10, a timer circuit 11, an N-channel MOS transistor M5 12, a second oscillating circuit 14 which is different from the oscillating circuit 1 and an oscillating frequency control voltage input terminal 16 for the oscillating circuit 1 and the second oscillating circuit 14 which is different from the oscillating circuit 1.

FIG. 2 is a view for showing of the timing of operation of the step-down voltage output circuit using the charge pump circuit in accordance with the fifth embodiment of the present invention. As FIG. 2 is common to the third embodiment, description thereof is omitted.

FIG. 3 is a view for showing of the timing of operation at power-on of the step-down voltage output circuit using the charge pump circuit in accordance with the fifth embodiment of the present invention. When VCC is applied, the oscillating circuit 1 and the second oscillating circuit 14 start self-oscillation and output clock signals V1 and V6 respectively the oscillating frequency of which is controlled, based on a voltage V8 input from the oscillating frequency control voltage input terminal 16. As other operations in this embodiment are the same as those in the third embodiment, description thereof is omitted.

For example, by inputting an oscillating frequency control voltage from an external microcomputer to the oscillating frequency control voltage input terminal 16, it is possible to control the oscillating frequency of the oscillating circuit 1 and also to extend or shorten the period during which the M5 is turned ON according to the oscillating frequency of the oscillating circuit 1.

Embodiment 6

Figure 8:
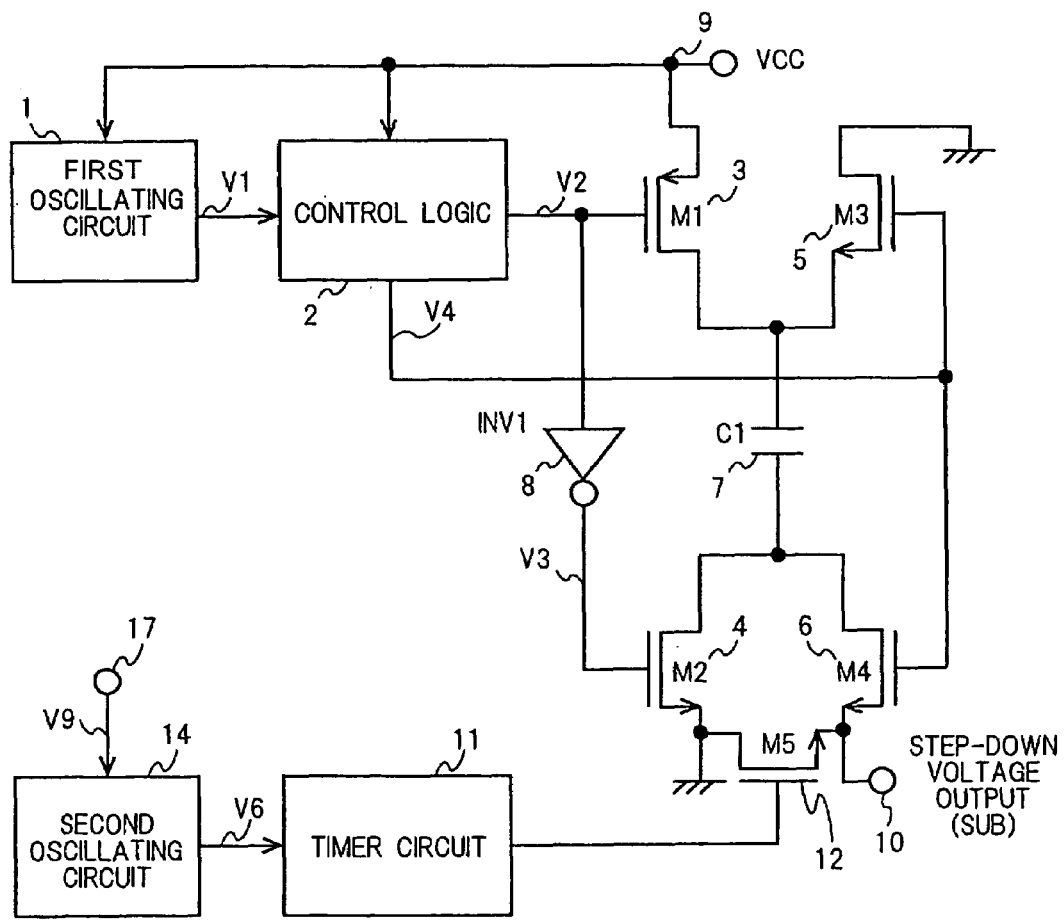
FIG. 8 is a block diagram of the step-down voltage output circuit using the charge pump circuit in accordance with the sixth embodiment of the present invention.
Figure 9:
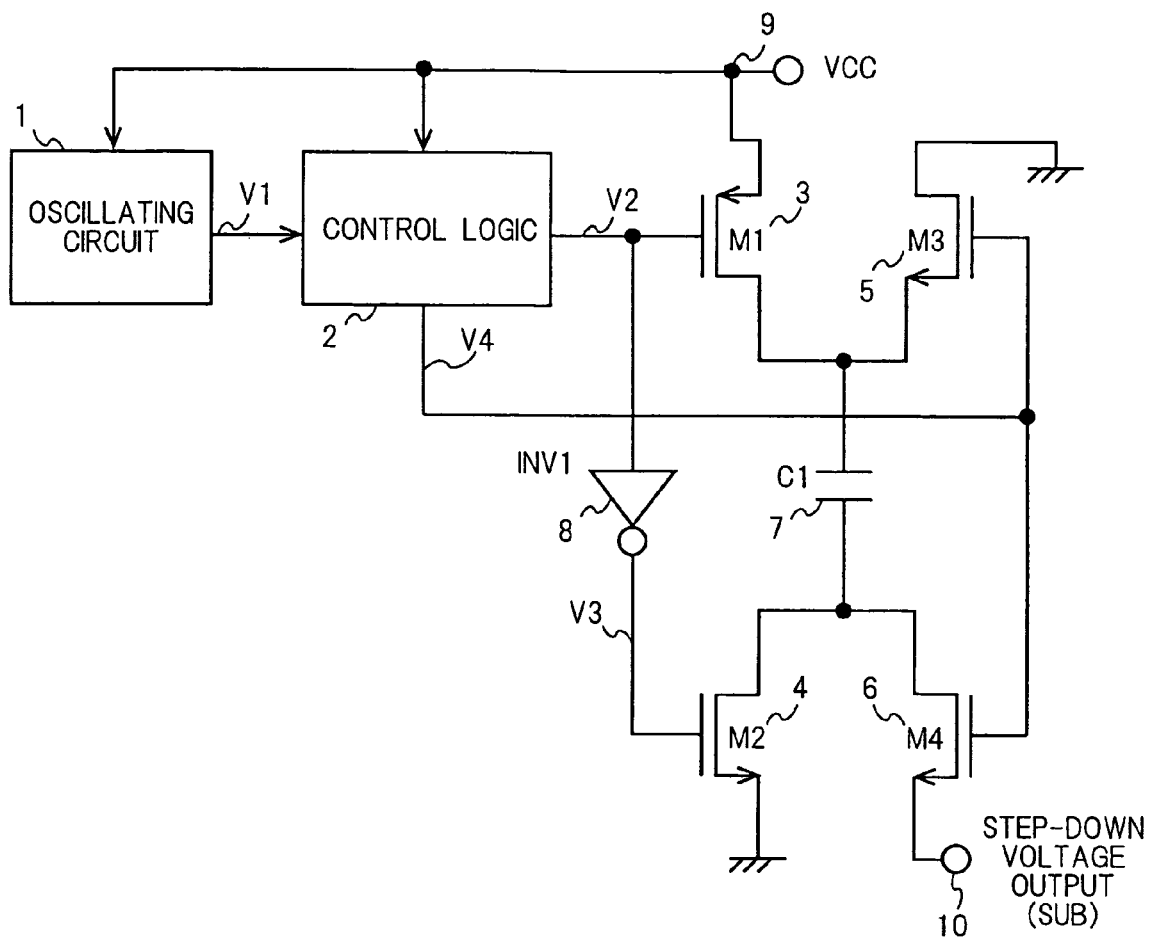
FIG. 9 is a block diagram of the step-down voltage output circuit using the charge pump circuit in accordance with the conventional example.

Referring to FIG. 2, FIG. 3 and FIG. 8, a step-down voltage output circuit using a charge pump circuit in accordance with a sixth embodiment of the present invention will be described. FIG. 8 is a block diagram of the step-down voltage output circuit using the charge pump circuit in accordance with the sixth embodiment of the present invention. The sixth embodiment (FIG. 8) is different from the third embodiment (FIG. 5) in that an oscillating frequency control voltage input terminal 17 for a second oscillating circuit 14 which is different from an oscillating circuit 1 is added. In FIG. 8, the same reference numerals are assigned to the same components in FIG. 5 (third embodiment) and description thereof is omitted.

FIG. 8 shows the oscillating circuit 1 which oscillates at a predetermined frequency and outputs a clock signal V1, a control logic 2 which receives the clock signal V1 as an input signal, an M1 3, an M2 4, an M3 5, an M4 6, a capacitor 7, an INV1 8, a VCC terminal 9, a VSUB terminal 10, a timer circuit 11, an N-channel MOS transistor M5 12, a second oscillating circuit 14 which is different from the oscillating circuit 1 and an oscillating frequency control voltage input terminal 17 for the second oscillating circuit 14 which is different from the oscillating circuit 1.

FIG. 2 is a view for showing of the timing of operation of the step-down voltage output circuit using the charge pump circuit in accordance with the sixth embodiment of the present invention. As FIG. 2 is common to the third embodiment, description thereof is omitted.

FIG. 3 is a view for showing of the timing of operation at power-on of the step-down voltage output circuit using the charge pump circuit in accordance with the fifth embodiment of the present invention. When the voltage VCC is applied, the second oscillating circuit 14 starts self-oscillation and outputs a clock signal V6 the oscillating frequency of which is controlled, based on a voltage V9 input from the oscillating frequency control voltage input terminal 17. As other operations in this embodiment are the same as those in the third embodiment, description thereof is omitted.

For example, by inputting an oscillating frequency control voltage from an external microcomputer to the oscillating frequency control voltage input terminal 17, the period during which the M5 is turned ON can be extended or shortened according to the situation.

In the above-mentioned first to sixth embodiments, for the period during which the M5 is turned ON, both ends of the capacitor 7 are short-circuited through the M3, M5 and M4 in the operation timing T2 (HIGH period of the control signal V4). In the case where the capacity C1 of the capacitor 7 is extremely large, the M3, M5 or M4 may be damaged due to a short circuit discharge current of the capacitor 7. It is possible to invert the signal V5 input to the M5 (for example, output signal of the timer circuit 11 in FIG. 1) with an inverter (additional element), input the inverted signal of the signal V5 and the control signal V4 output from the control logic 2 to a two-input AND circuit (additional element), and input the output signal of the two-input AND circuit to the gate electrodes of the M3 and M4. As a result, as the M3 and M4 remains OFF state for the period during which the M5 is turned ON, the M3, M5 or M4 can be prevented from being damaged during this period. Electrical charge accumulated in the capacitor 7 is not discharged for the period during which the M5 is turned ON, so that the time elapsed before the voltage at both ends of the capacitor 7 reaches a predetermined voltage VC (approximate to the power supply voltage VCC) can be reduced.

In addition, it is also possible to input the control signal V2 output from the control logic 2 and the inverted signal of the signal V5 to the two-input AND circuit (additional element) and connect the output signal of the two-input AND circuit to the gate electrode of the M1 and the input terminal of the INV1. As a result, as the M1 and M2 remains ON state (the capacitor 7 is in a charged state) for the period during which the M5 is turned ON, so that the time elapsed before the voltage at both ends of the capacitor 7 reaches a predetermined voltage VC (approximate to the power supply voltage VCC) can be reduced.

The above-mentioned first to sixth embodiment may be applied to a bipolar semiconductor. By replacing the P-channel MOS transistor M1 with a PNP bipolar transistor and the N-channel MOS transistors M2, M3, M4 and M5 with PNP bipolar transistors, similar effects to those of the above-mentioned embodiments can be obtained.

The step-down voltage output circuit of the present invention is useful as the measures against latch-up in the step-down voltage output circuit, which occurs immediately after power-on.

While preferred embodiments of the present invention have been described in detail to a certain degree, it is to be understood that, within the scope and spirit of the claims made herein, the invention may be practiced otherwise than as specifically described herein, the invention may be modified in arrangement and detail without departing from such scope and spirit.

The invention claimed is:

1. A step-down voltage output circuit comprising:
   a charge pump circuit with a first oscillator;
   a second oscillator which is different from said first oscillator;
   a timer circuit in which a timer period is set according to an oscillating frequency of said second oscillator; and
   an N-channel MOS transistor in which one N-type diffusion layer is connected to an output terminal of said charge pump circuit, the other N-type diffusion layer is connected to ground potential, and a gate electrode is connected to an output terminal of said timer circuit to become conductive for said timer period.

2. The step-down voltage output circuit, as claimed in claim 1, further comprising a control terminal which receives a control signal from outside,
   wherein the oscillating frequencies of said first oscillator and said second oscillator are changed according to said control signal.

3. The step-down voltage output circuit, as claimed in claim 1, further comprising a control terminal which receives a control signal from outside,
   wherein the oscillating frequency of said second oscillator is changed according to said control signal.

4. A step-down voltage output circuit comprising:
   a charge pump circuit with a first oscillator;
   a timer circuit in which a timer period is set according to an oscillating frequency of said first oscillator;
   an N-channel MOS transistor in which one N-type diffusion layer is connected to an output terminal of said charge pump circuit generating a step-down voltage below ground potential, the other N-type diffusion layer is connected to ground potential, and a gate electrode is connected to an output terminal of said timer circuit to become conductive for said timer period, and
   a control terminal which receives a control signal from outside, wherein the oscillating frequency of said first oscillator is changed according to said control signal.

5. A step-down voltage output circuit comprising:
an output terminal;
a charge pump circuit having a first oscillator, a control logic part which receives an output signal of said first oscillator as a clock and generates a first conduction instruction and a second conduction instruction, a first switching element which connects potential of a power-supply to one end of a capacitor and becomes conductive according to said first conduction instruction, a second switching element which connects the other end of said capacitor to ground potential and becomes conductive according to said first conduction instruction, a third switching element which connects ground potential to one end of said capacitor and becomes conductive according to said second conduction instruction, and a fourth switching element which connects the other end of said capacitor to said output terminal and becomes conductive according to said second conduction instruction;
a second oscillator which is different from said first oscillator;
a timer circuit that receives an output signal of said second oscillator and generates a third conduction instruction having HIGH level for a predetermined period after the power-supply is activated; and
an N-channel MOS transistor or an NPN-type bipolar transistor in which one N-type diffusion layer is connected to said output terminal, the other N-type diffusion layer is connected to said ground potential, and a gate electrode or a base electrode receives said third conduction instruction to become conductive for a predetermined period after the power-supply is activated.

6. The step-down voltage output circuit, as claimed in claim 5, further comprising a control terminal which receives a control signal from outside,
wherein the oscillating frequencies of said first oscillator and said second oscillator are changed according to said control signal.

7. The step-down voltage output circuit, as claimed in claim 5, further comprising a control terminal which receives a control signal from outside,
wherein the oscillating frequency of said second oscillator is changed according to said control signal.

8. The step-down voltage output circuit, as claimed in claim 5, wherein for the period during which said third conduction instruction is output, said third switching element and said fourth switching element are put into a blocking state.

9. The step-down voltage output circuit, as claimed in claim 8, wherein for the period during which said third conduction instruction is output, said first switching element and said second switching element are put into a conductive state.

10. A step-down voltage output circuit comprising:
an output terminal;
a charge pump circuit having a first oscillator, a control logic part which receives an output signal of said first oscillator as a clock and generates a first conduction instruction and a second conduction instruction, a first switching element which connects potential of a power-supply to one end of a capacitor and becomes conductive according to said first conduction instruction, a second switching element which connects the other end of said capacitor to ground potential and becomes conductive according to said first conduction instruction, a third switching element which connects ground potential to one end of said capacitor and becomes conductive according to said second conduction instruction, and a fourth switching element which connects the other end of said capacitor to said output terminal and becomes conductive according to said second conduction instruction;
a control terminal which receives a third conduction instruction; and
an N-channel MOS transistor or an NPN-type bipolar transistor in which one N-type diffusion layer is connected to said output terminal and the other N-type diffusion layer is connected to said ground potential to become conductive according to said third conduction instruction input to a gate electrode or a base electrode from said control terminal.

11. The step-down voltage output circuit, as claimed in claim 10, wherein for the period during which said third conduction instruction is output, said third switching element and said fourth switching element are put into a blocking state.

12. The step-down voltage output circuit, as claimed in claim 11, wherein for the period during which said third conduction instruction is output, said first switching element and said second switching element are put into a conductive state.

* * * * *